(12) United States Patent
Tipton et al.

(10) Patent No.: US 6,464,865 B2
(45) Date of Patent: Oct. 15, 2002

(54) WASTEWATER DISPERSAL SYSTEM

(75) Inventors: Gary A. Tipton, Houston, TX (US); Douglas E. Fessel, Waterville, MN (US)

(73) Assignee: EcoKasa Incorporated, Houston, TX (US)

( * ) Notice: Subject to any disclaimer, the term of this patent is extended or adjusted under 35 U.S.C. 154(b) by 0 days.

(21) Appl. No.: 09/819,973

(22) Filed: Mar. 28, 2001

(65) Prior Publication Data

US 2001/0030151 A1 Oct. 18, 2001

Related U.S. Application Data

(60) Provisional application No. 60/193,133, filed on Mar. 29, 2000.

(51) Int. Cl.[7] .............................................. E03B 11/00
(52) U.S. Cl. ....................... 210/170; 210/532.2; 405/44; 405/45; 405/50
(58) Field of Search .............................. 210/170, 532.2, 210/747; 405/43, 44, 45, 50

(56) References Cited

U.S. PATENT DOCUMENTS

| | | | | |
|---|---|---|---|---|
| 2,743,313 A | * | 2/1956 | Morrison | 405/45 |
| 2,817,956 A | * | 12/1957 | Young | 405/45 |
| 3,038,396 A | * | 6/1962 | Jameson, Jr. et al. | 405/43 |
| 3,680,704 A | * | 8/1972 | Schnefer | 210/170 |
| 3,770,623 A | * | 11/1973 | Seidel | 210/170 |
| 3,925,206 A | * | 12/1975 | Den | 210/170 |
| 4,188,154 A | * | 2/1980 | Izatt | 405/43 |
| 4,895,645 A | * | 1/1990 | Zorich, Jr. | 210/170 |
| 4,948,295 A | * | 8/1990 | Pramsolev | 405/43 |
| 5,017,040 A | * | 5/1991 | Mott | 210/170 |
| 5,152,634 A | * | 10/1992 | Maso | 405/45 |
| 5,997,735 A | * | 12/1999 | Gorton | 210/532.2 |
| 6,270,661 B1 | * | 8/2001 | Juwett | 210/170 |

OTHER PUBLICATIONS

*Alternative Design for Mound Systems–Vertical Side Wall (Box) Mounds;* Wespetal; *Trade Seminar Paper (Fort Worth).*
*Wasterwater Engineering Treatment, Disposal, and Reuse, Third Edition,* Metcalf & Eddy, Inc.; pp. 1037–1038.

* cited by examiner

Primary Examiner—Christopher Upton
(74) Attorney, Agent, or Firm—Kinney & Lange, P.A.

(57) ABSTRACT

The present invention is a compact water dispersal system located on an outdoor ground site. The system includes a water treatment system resulting in treated water with an organic loading of less than about 20 ppm and a suspended solids concentration of less than about 20 ppm. The water flows from the water treatment system to an interior discharge pipe having a plurality of perforations. Through the perforations, the water flows into an exterior discharge pipe surrounding the interior discharge pipe, the exterior discharge pipe also having a plurality of perforations. The exterior discharge pipe is surrounded by a layer of wicking material. A volume of fill material surrounds the interior discharge pipe, the exterior discharge pipe, and the layer of wicking material, thereby dispersing the water therefrom.

20 Claims, 6 Drawing Sheets

WASTEWATER DISPERSAL SYSTEM

CROSS-REFERENCE TO RELATED APPLICATION(S)

This application claims the priority benefits of U.S. Provisional Patent Application Serial No. 60/193,133, filed Mar. 29, 2000.

BACKGROUND OF THE INVENTION

Septic systems and many other wastewater treatment systems depend upon a disposal field for final treatment and disposal of the effluent wastewater. The most common types of disposal fields are shallow trenches filled with a porous medium. There are a variety of disposal fields; each is designed to address various site conditions and restrictions. These conditions include organic loading of the wastewater, soil permeability, the depth of impervious substratum, the depth of soils over openly fractured bedrock, the grade of slopes, the amount of land available, the sensitivity of groundwater in the area, and the depth of the water table.

Known disposal fields include mound systems, peat systems, and sand filters, for example. Dispersal and final treatment occurs as the effluent flows over and through the porous medium, as it infiltrates into the soil, and as it percolates through the soil. The treatment is a result of a combination of physical, biologic, and chemical transformations. Current technologies generally dispose of wastewater that has been treated through an aerobic process or other technologies by employing a drip irrigation system, utilizing an above ground sprinkler system, direct discharge to lakes or streams, or through a buried disposal field.

The success of a disposal field is determined by a variety of factors that include the hydraulic loading rate, the site characteristics discussed above, the organic loading of the effluent wastewater, and design criteria. All of these factors are considered in determining the length and size of the disposal field. The result is generally a large disposal field, usually on the order of 150 feet by 200 feet, that is expensive and unsightly or not feasible due to size or other site constraints.

BRIEF SUMMARY OF THE INVENTION

This invention provides a compact, efficient, visually appealing, and economical means for dispersal of treated effluent wastewater from processes such as aerobic treatment systems. It is especially useful where a minimum vertical separation is required between the discharge point and the water table, or where limited land surface space is available. The source of the wastewater can be from residential, commercial, or industrial applications, for example. The treatment process is not limited to aerobic treatment systems, but the effluent should be sufficiently treated by the system prior to dispersal by the system of the present invention.

Because the water is pretreated, biomass growth is limited since the effluent wastewater has most of the organic loading removed. Also, suspended solids have been reduced to very low levels. This reduces the amount of plugging in the interstitial space of the soil particles. As a result, material for the dispersal field can be selected based on its hydraulic loading characteristics with very little consideration required for the organic loading of the wastewater or the retention time necessary to achieve effluent treatment.

The present invention is a compact water dispersal system located on an outdoor ground site. The system includes a water treatment system resulting in treated water with an organic loading of less than about 20 ppm and a suspended solids concentration of less than about 20 ppm. The water flows from the water treatment system to an interior dispersal pipe having a plurality of perforations. Through the perforations, it flows into an exterior dispersal pipe surrounding the interior dispersal pipe, the exterior dispersal pipe also having a plurality of perforations. The exterior dispersal pipe is surrounded by a layer of wicking material. A volume of fill material surrounds the interior dispersal pipe, the exterior dispersal pipe, and the layer of wicking material, thereby dispersing the water therefrom.

DETAILED DESCRIPTION

Figure 1:
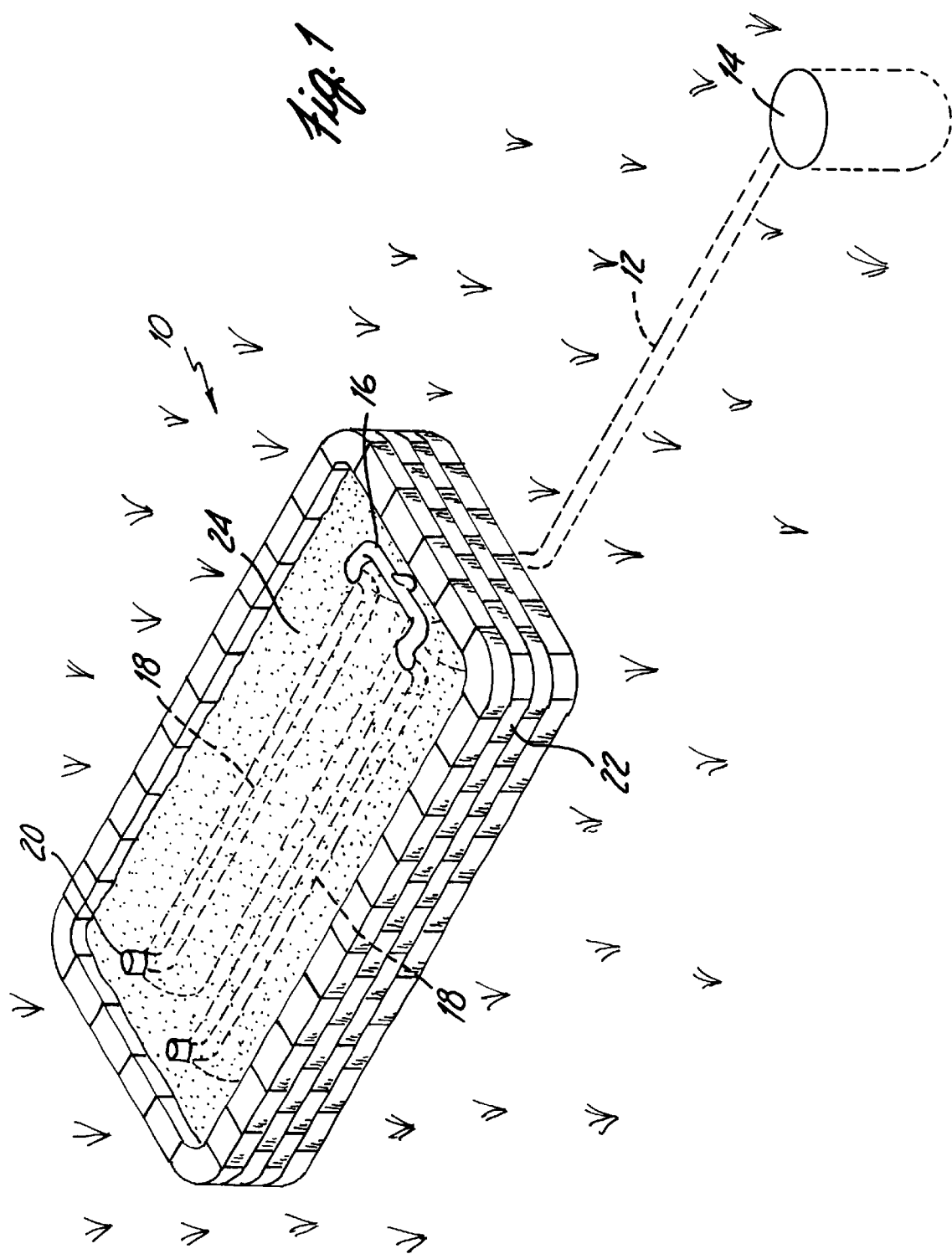
FIG. 1 is a perspective view of a preferred embodiment of the wastewater dispersal system of the present invention.

FIG. 1 is a perspective view of a preferred embodiment of the wastewater dispersal system of the present invention. This invention provides a mechanism to disperse the treated wastewater and to achieve separation by building a structure above ground. This structure can take many forms and sizes. A key component of this invention is the greatly reduced size of the dispersal field due to its unique design advantages. For a single residential application, wastewater dispersal system 10 preferably utilizes a land surface area of less than about 500 square feet, and more preferably less than about 250 square feet. Wastewater dispersal system 10 is connected by conduit 12 to wastewater treatment system 14. Dispersal system 10 includes conduit fork 16, dispersal lines 18 with ports 20, retaining wall 22, and bed 24.

Treatment system 14 is preferably buried in the ground for aesthetic reasons, though the top of treatment system 14 may be accessible for cleaning and other maintenance. Fluid conduit 12 allows treated water from treatment system 14 to flow to dispersal system 10. The distribution may be by a gravity fed or pressure system. In a preferred embodiment, the treated water has an organic loading of less than about 20 ppm as measured by $BOD_5$ test procedures and has a suspended solids concentration of less than about 20 ppm. To ensure pathogen removal, a loading rate of about six gallons/$ft^2$·day or less is normally used.

Conduit 12 is also preferably buried in the ground, and is directed under retaining wall 22 and into bed 24. Inside bed 24, conduit 12 may branch out at fork 16 into a plurality of dispersal lines 18. The number of lines used will depend on the geometry of bed 24; generally, wider beds may require more lines for optimal dispersal of the treated wastewater. Fork 16 is shown exposed for purposes of illustration, but it is usually buried inside bed 24.

The configuration of bed 24 will vary to meet the design criteria of the site and user. Dispersal lines 18 are perforated so that water flows out of the lines and into the bed at regular intervals along lines 18. Dispersal lines 18 terminate in ports 20, which serve a dual purpose: they allow gases to escape and allow an operator to obtain samples of the treated wastewater. Bed 24 may lie at ground level, or it may be elevated and contained by retaining wall 22.

The height of retaining wall 22 may be dictated by a required separation between the dispersal field and the water table. For example, Minnesota regulations require at least a three foot separation within a 1000 foot setback from a water source, such as a lake, stream, river, or creek.

In a preferred embodiment, plants may be planted in bed 24 to provide for improved aesthetics and to increase water uptake and dispersion. In cases where other contaminants may remain in the wastewater, plants capable of remediating specific contaminants may be selected. Another consideration in planting is the uptake of water from the distribution system. This ability to absorb and utilize the treated effluent allows for further reduction in the size of the disposal field.

To install system 10, the ground surface where system 10 is to be placed is disturbed, such as by tilling, to facilitate infiltration of the dispersal water. In areas where the percolation of the subsurface is low, such as rock zones, increased infiltration can be achieved by boring holes into the ground below the area of dispersal system 10. The number and size of holes are determined by the measured infiltration rate and flow rate. The holes are preferably filled with a porous medium to prevent restriction.

For example, on a site with poor soil infiltration and a relatively deep water table, ten boreholes 20 feet deep and 3 inches in diameter may be placed at 4 foot spacings. The boreholes may then be filled with pea gravel, ¼ inch to ½ inch in diameter. Then, dispersal system 10 may be constructed over the borehole site.

Upon completion of the site preparation work, a containment barrier such as retaining wall 22 is erected. The height of retaining wall 22 is determined by the required separation of the dispersal mechanism, in this case dispersal lines 18, and the water table.

Retaining wall 22 can be made of, but is not limited to, various materials such as paving stones, wood timbers, natural stones, bricks, plywood or poured concrete. A fluid barrier such as plastic sheeting may be placed along the inside of retaining wall 22 to prevent effluent water from passing through the walls of the structure, and to help maintain the temperature of the system. Once the containment structure is built, fill material, which can be sand, gravel, mulch, or other porous materials are placed within retaining wall 22.

The fill material used in bed 24 and the volume of water dispersed to the structure determine the length and width of the containment structure. There are a number of soil variations to consider when installing the invention. Soil texture classifications can include coarse sand, find sand, sandy loam, loam, silty loam and clay. Soil conditions are also considered, such as compacted natural soil, slope of the ground, and site conditions. Above the natural soil, a layer of sand, preferably meeting the ASTM C-33 standard is deposited. Then, a rock bed may be deposited to aid in water percolation. A suitable rock may be pea gravel; the type of rock may be specified by local regulations.

Moreover, it has been found that fill material containing sawdust, wood chips, and compost have been effective at reducing phosphorus and nitrate levels in the treated wastewater. In most domestic wastewater, phosphorus is present in three forms: orthophosphate, polyphosphate, and organic phosphorus. Polyphosphate and organic phosphorus are normally converted to orthophosphate during a biological treatment process.

Flow calculations are performed to determine the size of the disposal field. These calculations take into account the existing conditions, the average and peak flows of the treatment system, and other parameters.

In a preferred embodiment, discharge lines 18 are covered by at least about 6 inches of fill material to allow planting or other actions to be completed in bed 24. A plastic sheet may be placed over discharge lines 18 prior to placing the top layer of fill material where high rainfall requires isolation of the treated effluent water from the environment to prevent excess infiltration.

Figure 2:
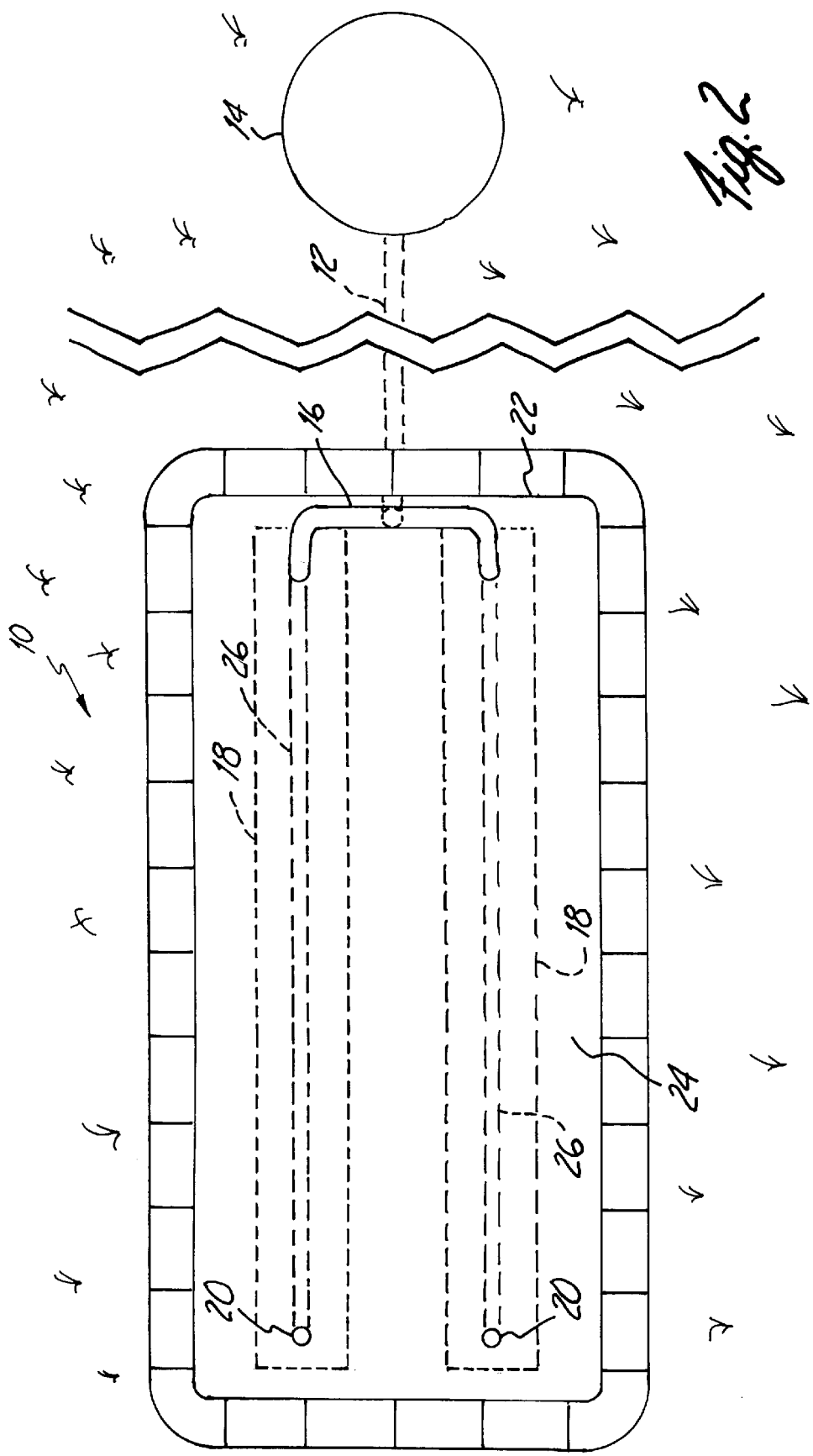
FIG. 2 is a top view of a preferred embodiment of the wastewater dispersal system of the present invention.

FIG. 2 is a top view of a preferred embodiment of the distribution system of the wastewater dispersal system of the present invention. In this example, conduit 12 comprises a 1½ or 2 inch diameter pipe, which may be constructed of known materials, such as PVC. Conduit 12 travels under retaining wall 22 and into bed 24, where it branches into a plurality of dispersal lines 18 at fork 16. In this example, two dispersal lines 18 are shown.

Each dispersal line 18 comprises an interior discharge pipe 26, which fluidly communicates with conduit 12. Interior discharge pipes 26 may preferably be made of a 1 to 2 inch diameter PVC pipe. Each dispersal line 18 also comprises an exterior discharge pipe 28 surrounding the respective interior discharge pipe 26. Exterior discharge pipe 28 may be constructed of 10 inch diameter SB-2 pipe or similar conduit. Interior discharge pipes 26 and exterior discharge pipes 28 contain perforations or holes for the dispersal of wastewater from treatment system 14, as will be further explained in the next drawing. Interior discharge pipes 26 terminate in ports 20.

The flow of wastewater from treatment system 14, through conduit 12, and through the described distribution system can be by gravity or pressure. In either case, the pipe diameters, pipe lengths, hole sizes, hole spacings and flow rates are considered to insure equal distribution of the dispersal water across the whole system.

Figure 3:
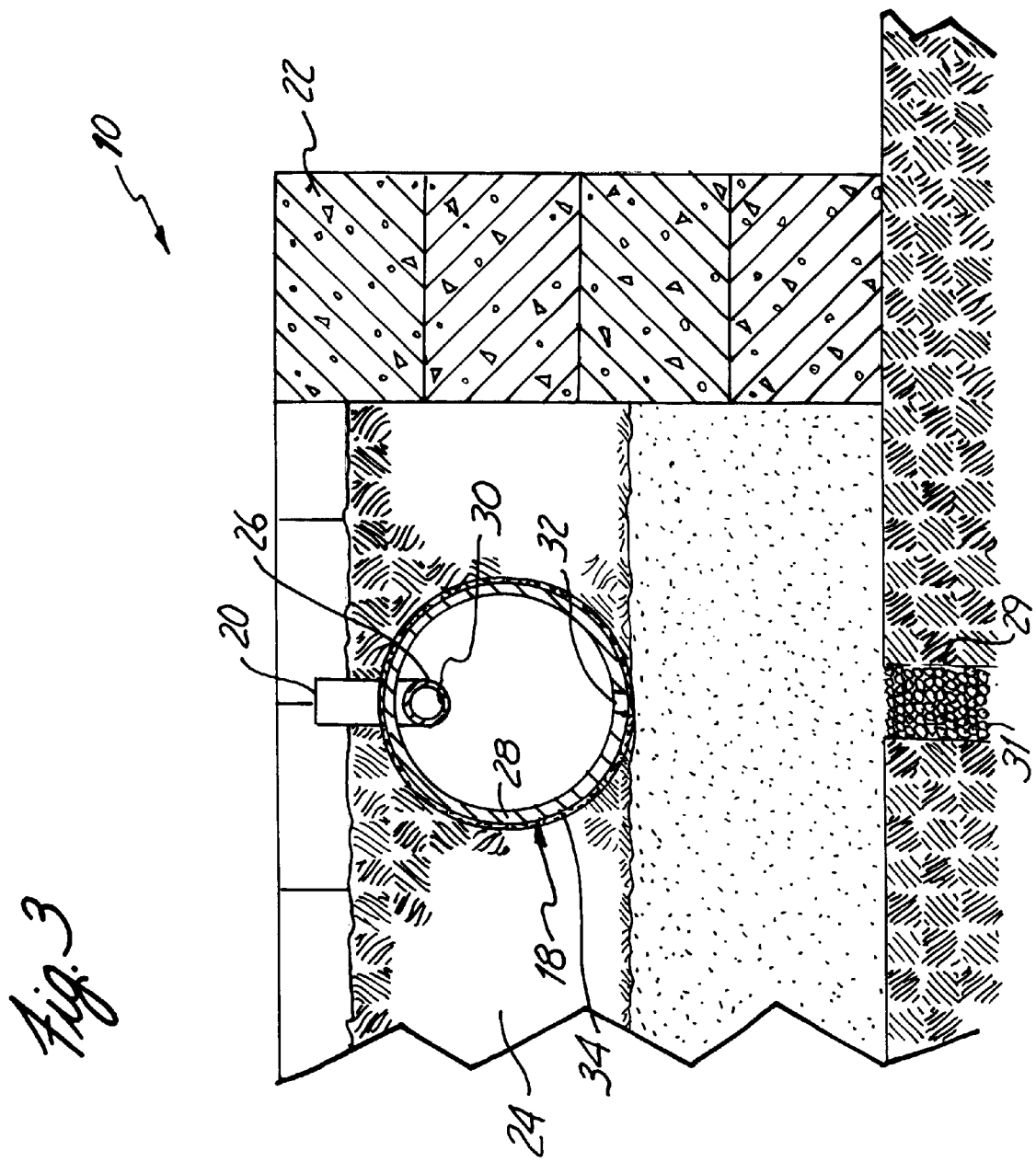
FIG. 3 is an elevation view of a preferred embodiment of the wastewater dispersal system of the present invention.

FIG. 3 is an elevation view of a preferred embodiment of a dispersal line 18 of the present invention. FIG. 3 shows one of a plurality of bore holes 29, filled with porous medium 31, in the ground below the area of dispersal system 10. Interior discharge pipe 26 comprises a plurality of perforations, preferably along a bottom surface of pipe 26, for the dispersal of wastewater from treatment system 14. The size and spacing of perforations 30 may be optimized, taking into consideration the size of pipe 26, the length of pipe 26, and the rate of water flow. The water flowing through interior discharge pipe 26 is typically pressurized, while the water in exterior discharge pipe 28 is usually discharged by gravity. Interior discharge pipe 26 is preferably disposed in an upper section of exterior discharge pipe 28.

During a dosing of water, pressurized water flows through interior discharge pipe 26 and is discharged into exterior discharge pipe 28 through perforations 30. Exterior discharge pipe 28 gradually starts to fill, but preferably not up to the level of interior discharge pipe 28. Between doses of water, the water in exterior discharge pipe 28 gradually flows out of perforations 32, and into wicking layer 34. From wicking layer 34, the water flows into the surrounding fill material of bed 24. One advantage of the dual pipe system is that the pressurization of water in interior discharge pipe 26 ensures that the water will be evenly distributed along the length of pipe 26. However, the slower gravity flow of water from exterior pipe 28 protects the surrounding fill material from being eroded away by strong jets of water.

Exterior discharge pipe 28 is preferably of a significantly larger diameter than interior discharge pipe 26 to facilitate the widespread dispersal of wastewater. A plurality of perforations 32 are disposed on exterior pipe 32, preferably on a bottom surface. Similarly, the size and spacing of perforations 32 may be optimized, taking into consideration the diameter and length of pipe 28 and the water flow rate.

Exterior discharge pipe 28 is preferably surrounded by a layer 34 of wicking material. The wicking layer may be made of any material that can absorb and distribute water. Suitable materials include textiles, such as felt, of cotton or other fibers. Wicking layer 34 functions to draw water around the entire diameter of exterior discharge pipe 28, thereby allowing the water to disperse throughout the fill material of bed 24. This is especially desirable where bed 24 contains fill materials, such as sawdust, wood chips, and compost, which reduce phosphorus and nitrate levels in the dispersed wastewater.

In the illustrated embodiment, fill material of bed 24 comprises a lower layer of washed sand and an upper layer of soil, compost, wood, and sawdust. The thicknesses and compositions of the fill material may vary in each application of the invention because of conditions including organic loading of the wastewater, soil permeability, the depth of impervious substratum, the depth of soils over openly fractured bedrock, the grade of slopes, the amount of land available, the sensitivity of groundwater in the area, and the depth of the water table.

Figure 4:
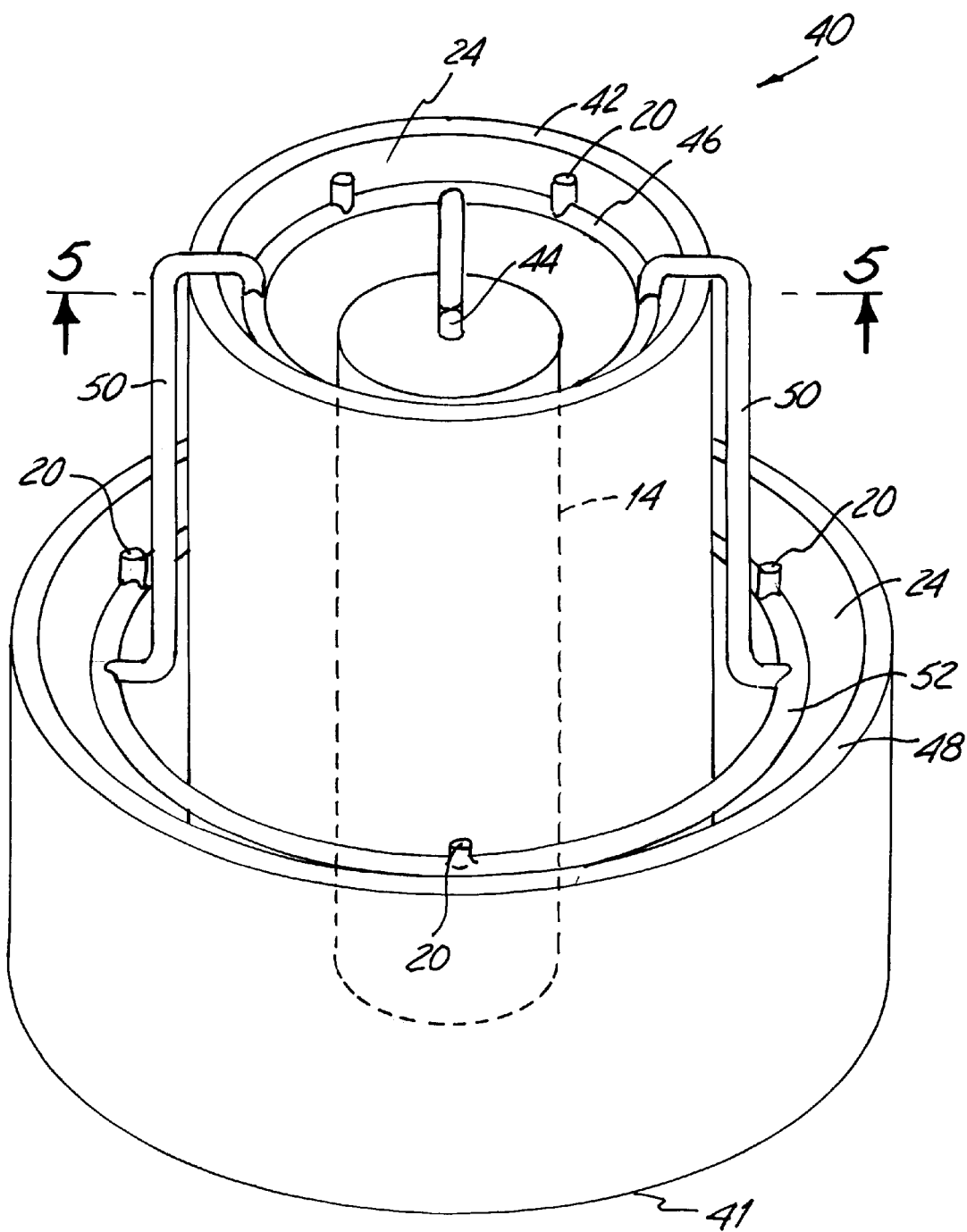
FIG. 4 is a perspective view of an alternate embodiment of the wastewater dispersal system of the present invention.

FIG. 4 is a perspective view of an alternate embodiment of the wastewater dispersal system 40 of the present invention. A site may have severe surface space limitations due to such factors as set back requirements from lakes, water wells, property lines, and roads. In this embodiment, a tank containing treatment system 14 is placed at ground level 41 and insulated to prevent freezing during cold conditions. First circular retaining wall 42 is built around tank 14. In a preferred embodiment, wall 42 has a height of about 8 feet and a diameter of about 7 feet.

Fill material is deposited within retaining wall 42 and around tank 14 to form bed 24. Using a fill material containing wood products is effective at reducing phosphorus levels, as well as insulating tank 14 from temperature extremes. Because the containment barrier 42 is much higher than in previous embodiments, system 40 is capable of discharging more water per square footage of land surface area. Conduit 44 allows for fluid communication between treatment system 14 and first toroidal dispersal line 46. First dispersal line 46 includes ports 20. Instead of an annular configuration, dispersal line 46 can also comprise other designs, such as a radial spoke arrangement.

To increase the water dispersal capacity of system 40, second circular retaining wall 48 may be constructed around first circular retaining wall 42. In this example, second retaining wall 48 is about 3 feet high, with a diameter of about 12 feet. Second retaining wall 48 may be built to the same height as first retaining wall 42, but a tiered effect maybe preferred for aesthetic reasons. Conduit 50 connects first toroidal dispersal line 46 of first containment barrier 42 to second toroidal dispersal line 52 of second containment barrier 48. Second dispersal line 52 includes ports 20. While circular containment structures 42 and 48 are illustrated, other shapes and configurations may be used. The structures may be filled with a layer of sand, optionally rock, and then a fill of compost and wood chip material to create bed 24.

Figure 5A:
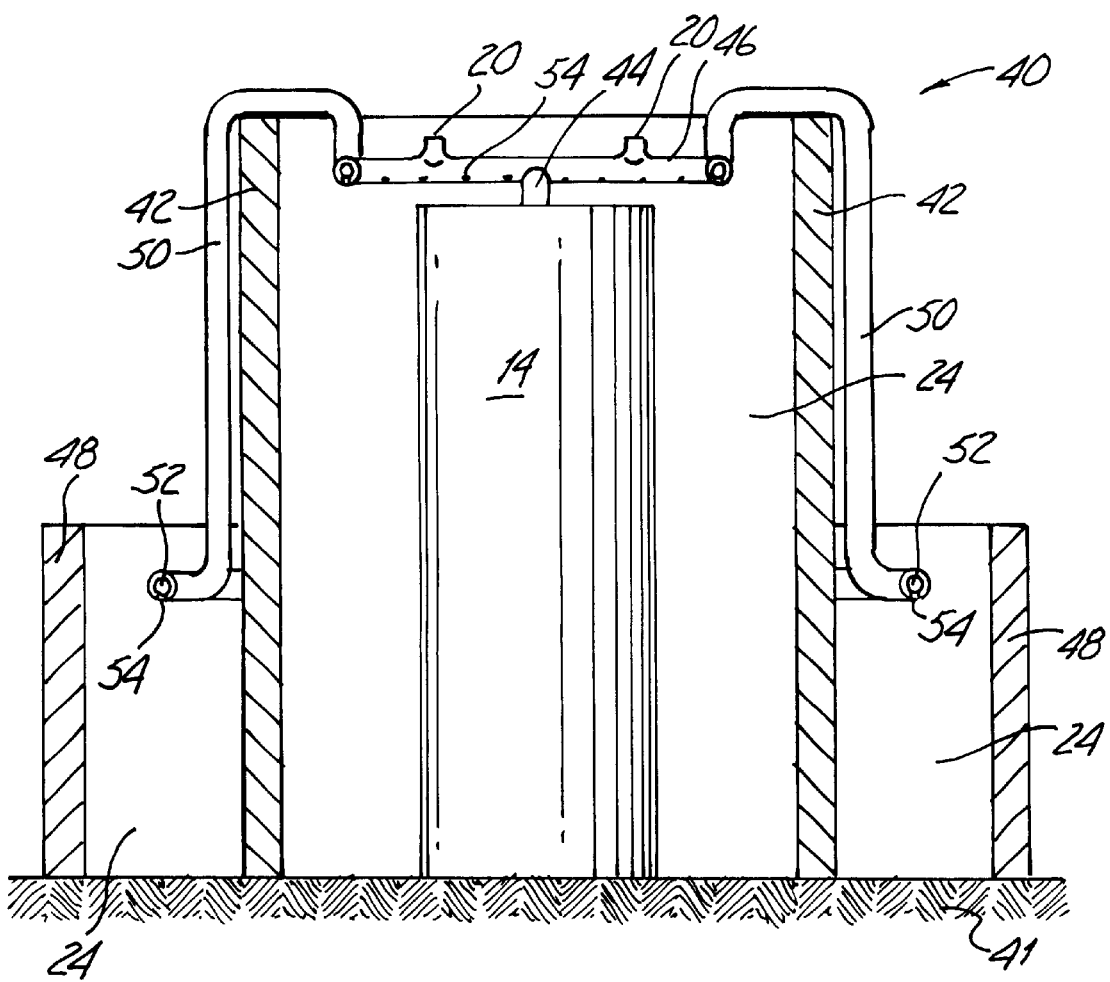
FIG. 5A is a sectional view of the embodiment of FIG. 4, taken along line 5—5 of FIG. 4.
Figure 5B:
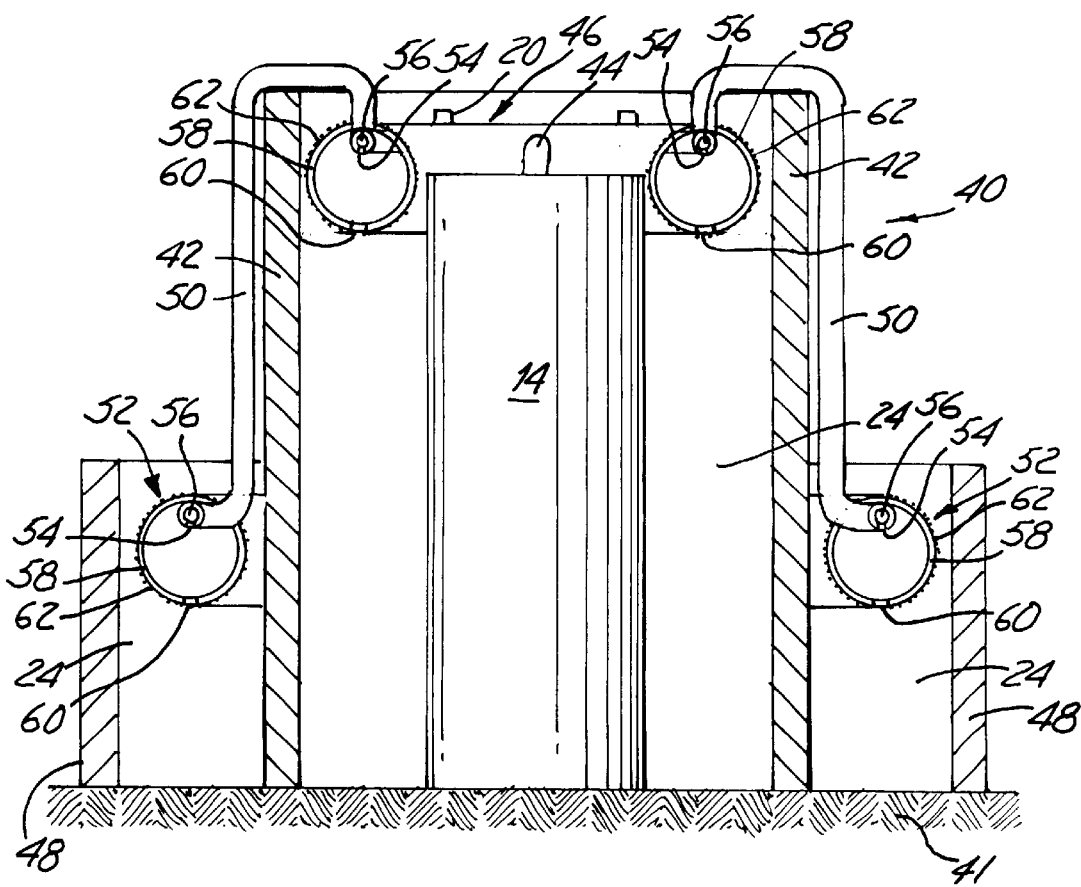
FIG. 5B is a sectional view of an alternate embodiment of FIG. 4, taken along line 5—5 of FIG. 4.

FIGS. 5A and 5B are sectional views of an alternate embodiment of FIG. 4, taken along line 5—5 of FIG. 4. As shown in FIG. 5A, dispersal line 46 may be a simple 1 inch diameter perforated pipe much like interior discharge pipe 26 of the previous embodiment, with perforations 54. This configuration is most useful where there are tight space constraints.

As shown in FIG. 5B, where space allows, dispersal lines 46 and 52 maybe functionally designed similarly to dispersal line 18 of the previous embodiments. In this embodiment, dispersal lines 46 and 52 each include interior discharge pipes 56 with perforations 54, exterior discharge pipes 58 with perforations 60, and wicking layer 62.

EXAMPLE

The following is a typical design for a single family 3 bedroom home, assuming a flow volume of 150 gallons per bedroom. Dispersal system 10 is located on at least 1 foot of natural soil above seasonally saturated soil or bedrock, the natural soil having a percolation rate of at least 120 MPI. Dispersal system 10 comprises a containment structure 22 that is 8 feet wide, 22 feet long, and of sufficient height to achieve a 3-foot separation above the saturated soil in the subsurface.

A layer of 6-mil plastic such as polyethylene or polyurethane may be used to line the inner sidewalls. A sand layer (ASTM C-33) may be deposited to achieve the desired separation. Above the sand layer, a rock bed layer that is about 13 inches thick may be used to allow for increased water percolation. Ideally, the rock bed layer will stop about 4 inches below the pipe dispersal lines 18.

The loading rate from treatment system 14 is about 1.2 gallons/ft$^2$·day. The distribution system of dispersal lines 18 consists of two twenty foot lengths of gravelless leachbed pipe 28, each comprising a 10-inch diameter SB-2 pipe. The system is usually a pressure distribution system. A 2-inch diameter PVC pipe 26 is suspended in each SB-2 pipe 28. Normal dosing is 20 to 30 gallons per dose. Dosing is repeated periodically throughout a day to disperse the required amount of water; in this case, 450 gallons per day.

Perforations 26 and 28 may be disposed so that the holes located near the input of system 10 may be relatively small and made progressively larger to insure even distribution of the applied effluent along the entire length of the system. The holes may be about 1/8 inch in diameter and placed at approximately 2 foot intervals. Above the rock bed layer, an eight-inch deep layer of compost and wood chips is added. Finally, plants are planted in the bed 24.

While the principles of this invention have been described in connection with specific embodiments, it should be understood clearly that these descriptions are made only by way of example and are not intended to limit the scope of the invention. Workers skilled in the art will recognize that changes may be made in form and detail without departing from the spirit and scope of the invention.

What is claimed is:

1. A water dispersal system comprising:
    a first dispersal pipe having a first plurality of perforations on a cylindrical surface thereof;
    a second dispersal pipe of larger diameter than the first dispersal pipe and surrounding the first dispersal pipe, the second dispersal pipe having a second plurality of perforations on a cylindrical surface thereof;
    a first layer of wicking material surrounding the second dispersal pipe; and
    a first volume of fill material surrounding the first layer of wicking material of the second dispersal pipe.

2. The water dispersal system of claim 1 further comprising:

a water treatment system; and a conduit in fluid communication with the water treatment system and the first dispersal pipe.

3. A compact water dispersal system located on an outdoor ground site, the system comprising:

a water treatment system resulting in treated water with an organic loading of less than about 20 ppm and a suspended solids concentration of less than about 20 ppm;

a first dispersal pipe having a first plurality of perforations on a cylindrical surface thereof;

a conduit in fluid communication with the water treatment system and the first dispersal pipe;

a first volume of fill material surrounding the first dispersal pipe, an exposed surface area of the fill material being less than about 500 square feet;

a second dispersal pipe of larger diameter than the first dispersal pipe and surrounding the first dispersal pipe, the second dispersal pipe having a second plurality of perforations on a cylindrical surface thereof; and a first layer of wicking material surrounding the second dispersal pipe.

4. The water dispersal system of claim 3 further comprising:

a first containment barrier structure containing the first volume of fill material, the first dispersal pipe, the second dispersal pipe, and the first layer of wicking material.

5. The water dispersal system of claim 4 in which a height of the containment barrier structure is sufficient to achieve a desired vertical separation between the second plurality of perforations and a water table level of the site.

6. The water dispersal system of claim 4 further comprising:

a third dispersal pipe having a third plurality of perforations on a cylindrical surface thereof;

a pipe fork comprising a plurality of branches, the fork being in fluid communication with the conduit and the first and third dispersal pipes; and a fourth dispersal pipe having a larger diameter than the third dispersal pipe, the fourth dispersal pipe surrounding the third dispersal pipe, the fourth dispersal pipe having a fourth plurality of perforations on a cylindrical surface thereof.

7. The water dispersal system of claim 6 further comprising a port disposed on each of the first and third dispersal pipes, the port extending above an exposed surface of the fill material.

8. The water dispersal system of claim 6 wherein the fill material comprises wood.

9. The water dispersal system of claim 6 wherein the fill material comprises compost.

10. The water dispersal system of claim 6 wherein the water treatment system is an aerobic water treatment system.

11. The water dispersal system of claim 6 wherein the first and third dispersal pipes are PVC pipes.

12. The water dispersal system of claim 6 wherein the conduit comprises a PVC pipe.

13. The water dispersal system of claim 6 wherein the second and fourth pipes are each a 10 inch diameter SB-2 pipe.

14. The water dispersal system of claim 6 wherein the perforations in each dispersal pipe are positioned along a bottom surface of the respective dispersal pipe.

15. The water dispersal system of claim 14 wherein the size of the perforations of the first and third plurality of perforations gradually increases as a distance from a perforation to the water treatment system increases.

16. The water dispersal system of claim 6 wherein the first dispersal pipe is positioned within an upper section of the second dispersal pipe, and the third dispersal pipe is positioned within an upper section of the fourth dispersal pipe.

17. The water dispersal system of claim 3 further comprising a plurality of holes bored vertically down into a ground surface of the site underneath the fill material, the holes filled with a porous medium.

18. A compact water dispersal system located on an outdoor ground site, the system comprising:

a water treatment system resulting in treated water with an organic loading of less than about 20 ppm and a suspended solids concentration of less than about 20 ppm;

a first dispersal pipe having a first plurality of perforations on a cylindrical surface thereof;

a conduit in fluid communication with the water treatment system and the first dispersal pipe;

a first volume of fill material surrounding the first dispersal pipe, an exposed surface area of the fill material being less than about 500 square feet;

a first containment barrier structure containing the first volume of fill material and the first dispersal pipe;

a second dispersal pipe having a second plurality of perforations on a cylindrical surface thereof;

a conduit in fluid communication with the first dispersal pipe and the second dispersal pipe; and a second containment barrier structure surrounding the first containment barrier structure and containing a second volume of fill material and the second dispersal pipe.

19. The water dispersal system of claim 18 in which a height of each containment barrier structure is sufficient to achieve a desired vertical separation between each perforation and a water table level of the site.

20. A compact water dispersal system located on an outdoor ground site, the system comprising:

an aerobic water treatment system resulting in treated water with an organic loading of less than about 20 ppm and a suspended solids concentration of less than about 20 ppm;

a plurality of interior dispersal pipes, each having a plurality of perforations on a bottom cylindrical surface thereof, wherein the size of the perforations gradually increases as the distance from the perforation to the water treatment system increases;

a conduit in fluid communication with the water treatment system and the interior dispersal pipe;

a pipe fork comprising a plurality of branches, the fork in fluid communication with the conduit and each of the interior dispersal pipes;

a plurality of exterior dispersal pipes, each of larger diameter than each interior dispersal pipe, one exterior dispersal pipe surrounding each interior dispersal pipe so that the interior dispersal pipe is positioned within an upper section of the exterior dispersal pipe, each exterior dispersal pipe having a plurality of perforations on a bottom cylindrical surface thereof;

a layer of wicking material surrounding each exterior dispersal pipe;

a volume of fill material surrounding the plurality of interior dispersal pipes, the plurality of exterior dispersal pipes, and each layer of wicking material, an exposed surface area of the fill material being less than about 500 square feet;

a port disposed on each exterior dispersal pipe, the port extending above the surface of the fill material; and a containment barrier structure containing the volume of fill material, the plurality of interior dispersal pipes, the plurality of exterior dispersal pipes, and each layer of wicking material; in which a height of the containment barrier structure is sufficient to achieve a desired vertical separation between the plurality of exterior dispersal pipes and a water table level of the site.

* * * * *